Figure 1:
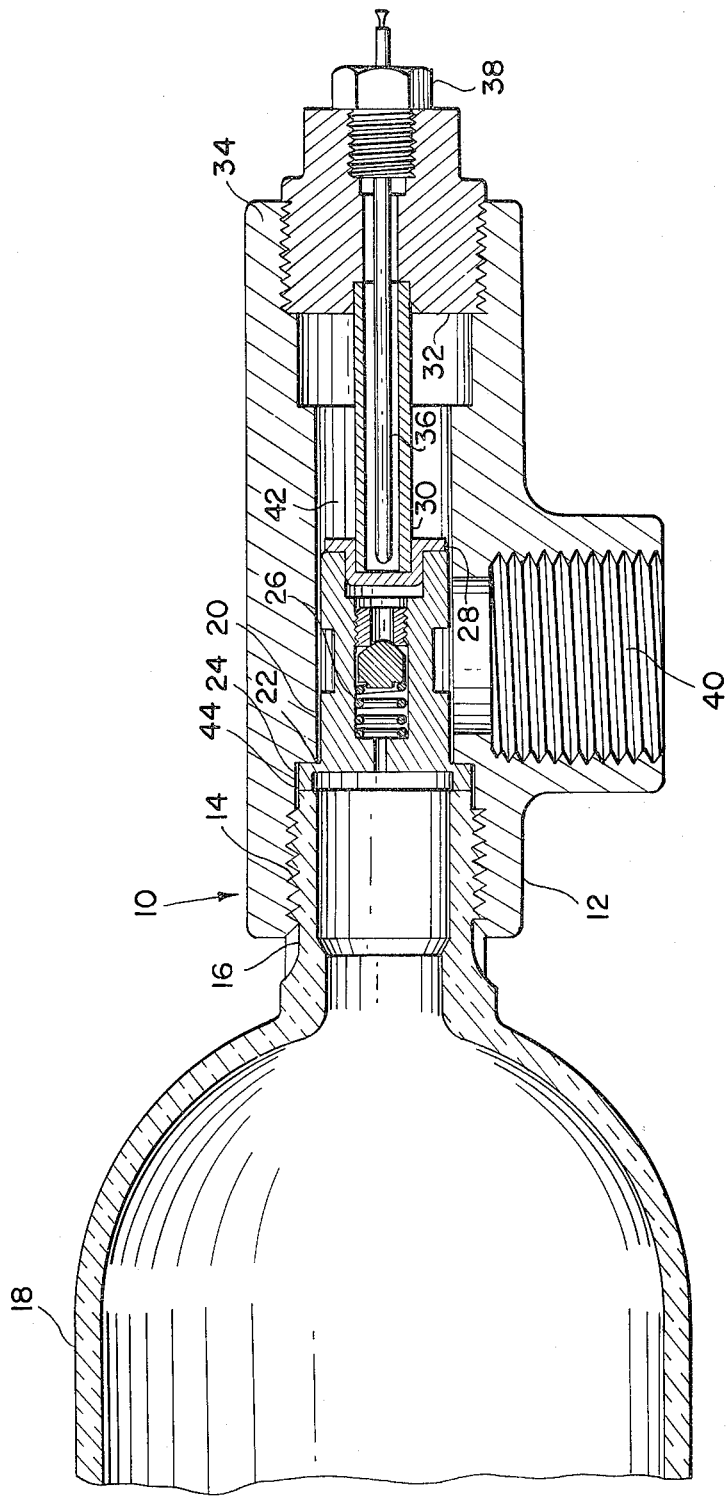

United States Patent [19]

Russell et al.

[11] 3,900,211
[45] Aug. 19, 1975

[54] PYROTECHNIC ACTUATED VALVE

[75] Inventors: Lowell L. Russell, Aptos; Claude E. Campbell, Gilroy, both of Calif.

[73] Assignee: Teledyne McCormick Selph, Hollister, Calif.

[22] Filed: Apr. 4, 1974

[21] Appl. No.: 457,890

[52] U.S. Cl. ............... 280/150 AB; 137/70; 222/3
[51] Int. Cl.² .................................... B60R 21/08
[58] Field of Search ............. 137/70, 71, 68, 69; 280/150 AB; 222/3

[56] References Cited
UNITED STATES PATENTS

| | | | |
|---|---|---|---|
| 3,017,894 | 1/1962 | Chilcoat | 137/69 |
| 3,209,937 | 10/1965 | Hirst et al. | 137/70 X |
| 3,743,318 | 7/1973 | Yamaguchi et al. | 137/68 X |
| 3,788,666 | 1/1974 | Kamer et al. | 280/150 AB |
| 3,791,670 | 2/1974 | Lucore et al. | 280/150 AB |
| 3,822,895 | 7/1974 | Ochiai | 280/150 AB |

*Primary Examiner*—David Schonberg
*Assistant Examiner*—John P. Silverstrim
*Attorney, Agent, or Firm*—David H. Semmes

[57] ABSTRACT

A fast acting valve adapted for actuation by a pyrotechnic charge, especially applicable to the purpose of discharging a container of compressed fluid into an inflatable automobile seat belt upon command, but useful to any application where an extremely fast-acting dump valve is required, the structure eliminating expulsion of component structure or pyrotechnic residue into the fluid stream.

6 Claims, 2 Drawing Figures

PYROTECHNIC ACTUATED VALVE

BACKGROUND OF THE INVENTION

The purpose of the present invention is to provide a valve which, when used in conjuction with a storage container, will provide for long term storage of fluid under high pressure. The valve is designed to provide very fast response upon receipt of an opening command and to provide a large flow area from the container without debris in the exhaust. The present invention constitutes an improvement in the state of the art with respect to sealing capability, response time, reliability, simplicity, cost and ease of manufacture.

Other known methods of accomplishing the same purpose as this invention are:

1. Rupture disks which are burst by a pyrotechnic charge either by increasing container pressure above the burst strength of the disk or by providing a shock wave which ruptures the disk or by a combination of the two. These methods usually allow the pyrotechnic exhaust products to mix with the fluid flow and allow a high risk of debris from the disk being expelled in the fluid stream.

2. Sealing disks which are sheared or punctured by a pyrotechnically driven shearing or puncturing device. These types of devices require complicated machinery techniques and tight machining tolerances in order to be reliable. The risk also exists of metallic debris being expelled in the exhaust stream.

3. Poppet-type closures containing a shearable section and supported against shear by a movable piston. The support piston is then moved away from the poppet by pyrotechnic means allowing the fluid pressure to shear the poppet and drive it clear of the outlet. This type of device requires close tolerance machining of the valve body, poppet and piston, thereby increasing manufacturing cost and lowering reliability. The requirement for sequential movement of two machined parts would also increase the function time.

BRIEF DESCRIPTION OF THE INVENTION

The invention is primarily designed for the purpose of discharging a container of compressed fluid into an inflatable automobile seat belt upon command. The structure contemplates full opening of a valve within 2 to 4 milliseconds after receipt of an electrical initiation signal to a pyrotechnic charge and inflation of the belt within 30 milliseconds. The valve of the present invention, upon actuation, fully opens within the required time and the structure includes a ceramic support tube to maintain a closed position which is destructed by means of the pyrotechnic charge. The ceramic support tube is reduced to powder and there is no expulsion of the support tube or pyrotechnic residue into the fluid stream.

Figure 2:
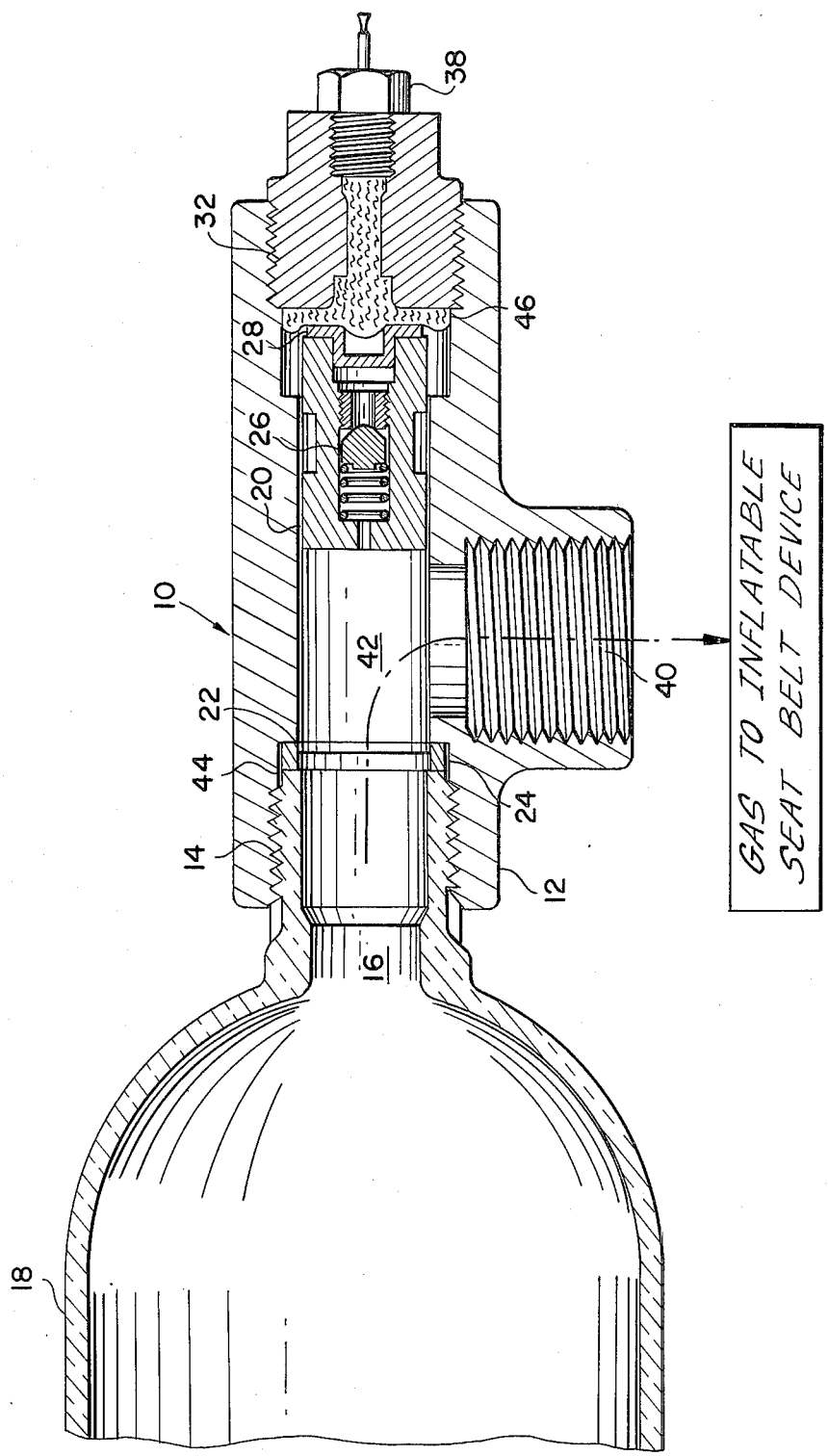

Additional objects and advantages of the invention will be more readily apparent from the following detailed description of an embodiment thereof taken together with the accompanying drawings in which:

FIG. 1 is a fragmentary sectional view through the valve as applied to a container of fluid under pressure with the valve in a closed position; and FIG. 2 is a view similar to FIG. 1 with the valve in open position subsequent to command activation of a pyrotechnic actuating charge.

Referring more specifically now to the drawings, the valve generally designated 10 includes a valve body 12 having a threaded inlet connector 14 for mating attachment with a threaded outlet 16 of a container 18 of a liquid under pressure. The hollow housing or body 12 contains therein a poppet 20 which contains a thin, shearable section 22 in the nature of a web, a sealing flange 24 and, if desired, a container fill valve 26, although for some constructions this can be omitted.

The poppet 20 is held in position by a poppet support 28 in the nature of a disc of appropriate material such as metal or the like in conjunction with a frangible support tube 30 of suitable material. The support tube 30 is located or juxtaposed against the poppet support 28 by means of a threaded tube retainer 32 which is inserted in threaded opening 34 in the end of valve body 12. Mating flanges of the tube and retainer tube coact for this purpose, thus holding the tube 30 in longitudinal compression as shown in FIG. 1.

The support tube 30 contains a pyrotechnic charge 36 which is activatable upon command by an initiator generally designated 38 of a known type.

The valve body 12 further contains a threaded outlet 40 which communicates with a poppet cavity indicated at 42 which is counter bored to accept the poppet flange 24 and threaded to accept a threaded connector 14 of the pressure vessel or container 18. When the container is threaded into the valve body, the seal interface 44 of container 18 is forced tightly against the flange 24 of poppet 20, so that opposite surface of flange 24 is also tightly butted against the internal flange which terminates the inlet of the valve body, thus forming a metallic seal. The poppet may also be attached to the container by means of metallic fusion, such as welding, brazing or soldering to provide a leak-proof joint.

The shear web 22 of poppet 20 is machined to a thickness whereby the internal fluid pressure of the container 18 may easily fracture the shear web 22 and force the poppet 20 to the opposite end of the poppet cavity 42 when the pyrotechnic charge 36 is activated by initiator 38, thereby pulverizing the support tube 30, allowing the fluid to flow through the outlet 40.

The valve is illustrated in the open position in FIG. 2. It has been found that there is no indication of expulsion of support tube or pyrotechnic residue into the fluid stream due to the construction utilized with the material of the pulverized support tube and pyrotechnic residue being confined as indicated at 46 between the retainer tube 32 and the poppet 20 as shown in FIG. 2.

The poppet 20, as previously mentioned, may contain a container fill valve 26 with no external openings other than the container outlet 16. After use, the valve is easily refurbishable by replacement of the poppet 20, support tube 30, pyrotechnic charge 36 and initiator 38.

An operable construction utilizes 1100-0 aluminum for the poppet and a ceramic support tube with a functional time of 2 to 5 milliseconds using an MDF line with a blasting cap and a container pressure of 2000 psig. In operation, the valve fully opens and the ceramic support tube is reduced to powder and there is no expulsion of support tube or pyrotechnic residue in the fluid stream.

Although the valve is primarily designed for seat belt inflation, it is adaptable to any application where an extremely fast-acting dump valve is required.

Manifestly, minor changes in details of construction can be effected without departing from the spirit and scope of the invention as defined in and limited solely by the appended claims.

We claim:

1. A pyrotechnic actuated valve connectable to a container of fluid under pressure, comprising:
   A. a hollow valve body having an inlet at one end connectable to a container of fluid under pressure, and terminating in an internal flange;
   B. said hollow valve body including a poppet cavity with a discharge outlet therefrom;
   C. a movable poppet in said poppet cavity including an external flange interconnected to a poppet body by a shearable web, said flange being engageable against said internal flange of said inlet and said poppet body normally closing said outlet;
   a poppet support positioned in operable engagement with said poppet, comprising a dished disc in engagement with said movable poppet, a retainer at the end of said valve body remote from said inlet, and a hollow, frangible tube held in longitudinal compression between said disc and said retainer; and
   E. a pyrotechnic charge internal of said frangible support tube adapted upon activation to disintegrate said support tube whereupon fluid pressure moves said poppet, after shearing said shearable web, to open said outlet with disintegrated material of said tube and pyrotechnic residue being maintained free from said outlet by the moved poppet.

2. A pyrotechnic actuated valve as claimed in claim 1, said retainer comprising a retainer tube threadedly engaged in the interior of the end remote from said inlet.

3. A pyrotechnic actuated valve as claimed in claim 1, wherein said discharge outlet is operatively connected with an inflatable automobile seat belt whereby upon command actuation of said pyrotechnic charge, fluid under pressure from said container is discharged into said seat belt with fluid flow being maintained free from disintegrated material and pyrotechnic residue.

4. A pyrotechnic actuated valve as claimed in claim 1 including an initiator external of said retainer tube and operatively connected with said pyrotechnic charge, said initiator being controllably activatable externally from said valve.

5. A pyrotechnic actuated valve as claimed in claim 1, said frangible support tube consisting of a hollow tube of ceramic material.

6. A pyrotechnic actuated valve as claimed in claim 1, said poppet body having an internal cavity therein opening outwardly at the end thereof proximate said external flange, a container fill valve operatively inserted in said cavity whereby said valve is operable with a container with no external openings other than the container outlet.

* * * * *